(12) United States Patent
Goossen et al.

(10) Patent No.: US 8,316,555 B2
(45) Date of Patent: Nov. 27, 2012

(54) NON-CONTACT DATA TRANSFER FROM MOVING SYSTEMS

(75) Inventors: Emray Goossen, Albuquerque, NM (US); David Baughman, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 429 days.

(21) Appl. No.: 12/633,998

(22) Filed: Dec. 9, 2009

(65) Prior Publication Data

US 2012/0276844 A1 Nov. 1, 2012

(51) Int. Cl.
*G01B 5/00* (2006.01)
(52) U.S. Cl. .......................................................... 33/561
(58) Field of Classification Search .................... 33/561, 33/361
See application file for complete search history.

(56) References Cited

U.S. PATENT DOCUMENTS

| | | | |
|---|---|---|---|
| 3,813,140 A | 5/1974 | Knockeart | |
| 3,952,151 A | 4/1976 | Jenkin | |
| 4,520,569 A * | 6/1985 | Ireland | 33/797 |
| 4,641,182 A | 2/1987 | Gur | |
| 4,816,923 A | 3/1989 | Saotome | |
| 5,157,485 A | 10/1992 | Howitt | |
| 5,402,235 A | 3/1995 | Monchalin | |
| 5,897,223 A * | 4/1999 | Tritchew et al. | 396/13 |
| 6,122,060 A | 9/2000 | Drake, Jr. | |
| 6,633,384 B1 | 10/2003 | Drake, Jr. et al. | |
| 6,744,467 B2 | 6/2004 | Thompson et al. | |
| 6,862,299 B2 | 3/2005 | Popescu | |
| 6,916,286 B2 | 7/2005 | Kazakevich | |
| 7,022,971 B2 | 4/2006 | Ura et al. | |
| 7,236,200 B2 | 6/2007 | Vernon | |
| 7,343,232 B2 * | 3/2008 | Duggan et al. | 701/24 |
| 7,463,363 B2 | 12/2008 | Drake, Jr. et al. | |
| 7,496,000 B2 * | 2/2009 | Vosburgh et al. | 367/134 |
| 7,559,892 B2 | 7/2009 | Adler et al. | |
| 7,693,624 B2 * | 4/2010 | Duggan et al. | 701/24 |
| 8,068,949 B2 * | 11/2011 | Duggan et al. | 701/24 |
| 8,068,950 B2 * | 11/2011 | Duggan et al. | 701/24 |
| 8,082,074 B2 * | 12/2011 | Duggan et al. | 701/24 |
| 8,089,225 B2 * | 1/2012 | Goossen | 318/16 |
| 8,103,398 B2 * | 1/2012 | Duggan et al. | 701/24 |

(Continued)

FOREIGN PATENT DOCUMENTS

EP 1 061 338 A1 12/2000

(Continued)

OTHER PUBLICATIONS

European Search Report from corresponding EP Application No. 10190767.3, mailed Mar. 25, 2011, 3 pages.

(Continued)

*Primary Examiner* — Yaritza Guadalupe-McCall
(74) *Attorney, Agent, or Firm* — Shumaker & Sieffert, P.A.

(57) ABSTRACT

Systems, devices, and methods are described that facilitate the transmission of image data collected by a sensor within a gimbal assembly. A gimbal assembly includes one or more sensors positioned within the gimbal assembly. The one or more sensors collect data. The gimbal assembly is controllable to aim the one or more sensors. The gimbal assembly further includes a communications module within the gimbal assembly. The communications module transmits at least one directional optical signal to communicate data collected by the sensor. At least one transducer is positioned to receive the at least one directional electromagnetic signal.

19 Claims, 7 Drawing Sheets

U.S. PATENT DOCUMENTS

| | | | |
|---|---|---|---|
| 2004/0169434 A1 | 9/2004 | Washington et al. | |
| 2006/0016966 A1 | 1/2006 | Hughes et al. | |
| 2006/0058960 A1* | 3/2006 | DuBois et al. | 701/220 |
| 2008/0219674 A1 | 9/2008 | Yamazaki | |
| 2009/0160951 A1 | 6/2009 | Anderson et al. | |
| 2009/0162071 A1* | 6/2009 | Refai et al. | 398/131 |
| 2010/0034424 A1* | 2/2010 | Goossen | 382/103 |
| 2011/0017863 A1* | 1/2011 | Goossen et al. | 244/3.14 |
| 2011/0301783 A1* | 12/2011 | Goossen | 701/2 |

FOREIGN PATENT DOCUMENTS

| | | |
|---|---|---|
| WO | 2006/065892 A2 | 6/2006 |

OTHER PUBLICATIONS

Communication from corresponding EP Application No. 10190767.3, mailed Apr. 21, 2011, 4 pages.

Reply to communication from the Examining Division, for EP Application No. 10190767.3, dated Aug. 4, 2011, 11 pages.

* cited by examiner

NON-CONTACT DATA TRANSFER FROM MOVING SYSTEMS

TECHNICAL FIELD

The disclosure relates to capturing and communicating image data and, more specifically, to the transfer of data from an image sensor of a gimbal assembly that is controlled to aim the image sensor.

BACKGROUND

Automated or semi-automated directional positioning control of sensors, including, for example, image sensor such as video and still cameras operating over a range of electromagnetic frequencies, is important in a variety of applications. Such control may be utilized in manufacturing tooling and other applications but is more widely known as desirable for various surveillance and security applications, and is specifically important for use with aircraft to capture visual data from above. In one example, surveillance equipment may be used in an Unmanned Aerial Vehicle (UAV) with sensor directional control to provide operator remote sensing and aerial situational assessment capabilities. In other examples, sensors may provide national airspace traffic sense-and-avoid threat detection. In still other examples, sensors may enable guidance of weaponry such as a cruise missile, where either an operator or an autonomous collision avoidance system rely on image sensor feedback to control the missile. In some examples, surveillance or other systems may employ systems or devices that provide for automated or semi-automated control of sensors, for example directional aiming of an image sensor. Such devices may also provide for motion stabilization of sensors.

Systems and devices that provide for the control and/or stabilization of image sensors may be referred to as gimbals. Gimbals enable the automatic or semi-automatic control of directional sensor positioning about a range of motion via various mechanical, electrical, and/or magnetic mechanisms. The range of motion of a gimbal may be about a single axis, or about multiple axes.

It may be advantageous to display and/or process data collected by a visual sensor of a gimbal system in real time, or close to real time. However, such data is often relatively large in size, which may render data transfer from the gimbal difficult.

A wired data connection to transmit data from a sensor of a gimbal system may cause forces that impede an ability of a gimbal to effectively position a visual sensor. Also, due to frequent and forceful gimbal movement, a wired data connection may become physically damaged over time, rendering a gimbal system wholly or partially inoperative.

Some gimbal systems employ one or more mechanical slip rings to transfer data from a sensor of the gimbal system. The mechanical slip rings may be placed on each axis of motion of a particular gimbal system. Aspects of a mechanical slip ring may limit an ability of designers to minimize the size of the gimbal system. Electromagnetic characteristics of mechanical slip rings may further cause the slip rings to have a limited data transfer rate.

SUMMARY

In general, this disclosure describes systems, methods and devices for the transfer of image data collected by one or more sensors of a gimbal assembly from the gimbal assembly via one or more directional electromagnetic signals. The one or more directional electromagnetic signals may be optical signals. The subject matter described by this application provides for communication of image data from a gimbal assembly without a wired connection that may exert non-linear forces that affect gimbal assembly movement and/or positioning. The subject matter described herein may enable transfer of image data at large bandwidths (e.g. greater than 500 Mbs), thus enabling transmission, processing, and/or display of image data in real or close to real-time while minimizing inertial loading. The subject matter provided herein may further enable communication of image data with a high degree of immunity to electromagnetic or other forms of interference.

In one example, this disclosure is directed to a system that includes a gimbal assembly. A sensor is carried by the gimbal assembly. The sensor collects data and the gimbal is controllable to aim the sensor. A communications module within the gimbal assembly transmits at least one directional electromagnetic signal to communicate data collected by the sensor. The at least one directional electromagnetic signal may be an optical signal. At least one transducer may be positioned to receive the at least one directional magnetic signal. The system may further include at least one focusing element that focuses the at least one directional electromagnetic signal upon the at least one transducer. The focusing element may be sized, shaped, and arranged to focus the at least one directional electromagnetic signal about a range of motion of the gimbal assembly.

In another embodiment, this disclosure describes a method comprising aiming, with a gimbal assembly, a sensor positioned within the gimbal assembly, collecting data by the sensor, and transmitting one or more directional electromagnetic signals to communicate the collected data to at least one transducer positioned to receive the at least one directional electromagnetic signal. The method may further comprise focusing the at least one directional electromagnetic signal upon the at least one transducer.

In another example, this disclosure describes a remotely controlled aircraft. The remotely controlled aircraft includes an aircraft body. A gimbal assembly is carried by the aircraft body. A sensor carried by the gimbal assembly collects image data. The gimbal assembly is controllable to aim the sensor. A communications module within the gimbal assembly transmits at least one directional electromagnetic signal to communicate the image data collected by the sensor. At least one transducer is positioned to receive the at least one directional electromagnetic signal. A display coupled to the at least one transducer may display the image data. The aircraft may be remotely controllable based at least in part on the displayed image data.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
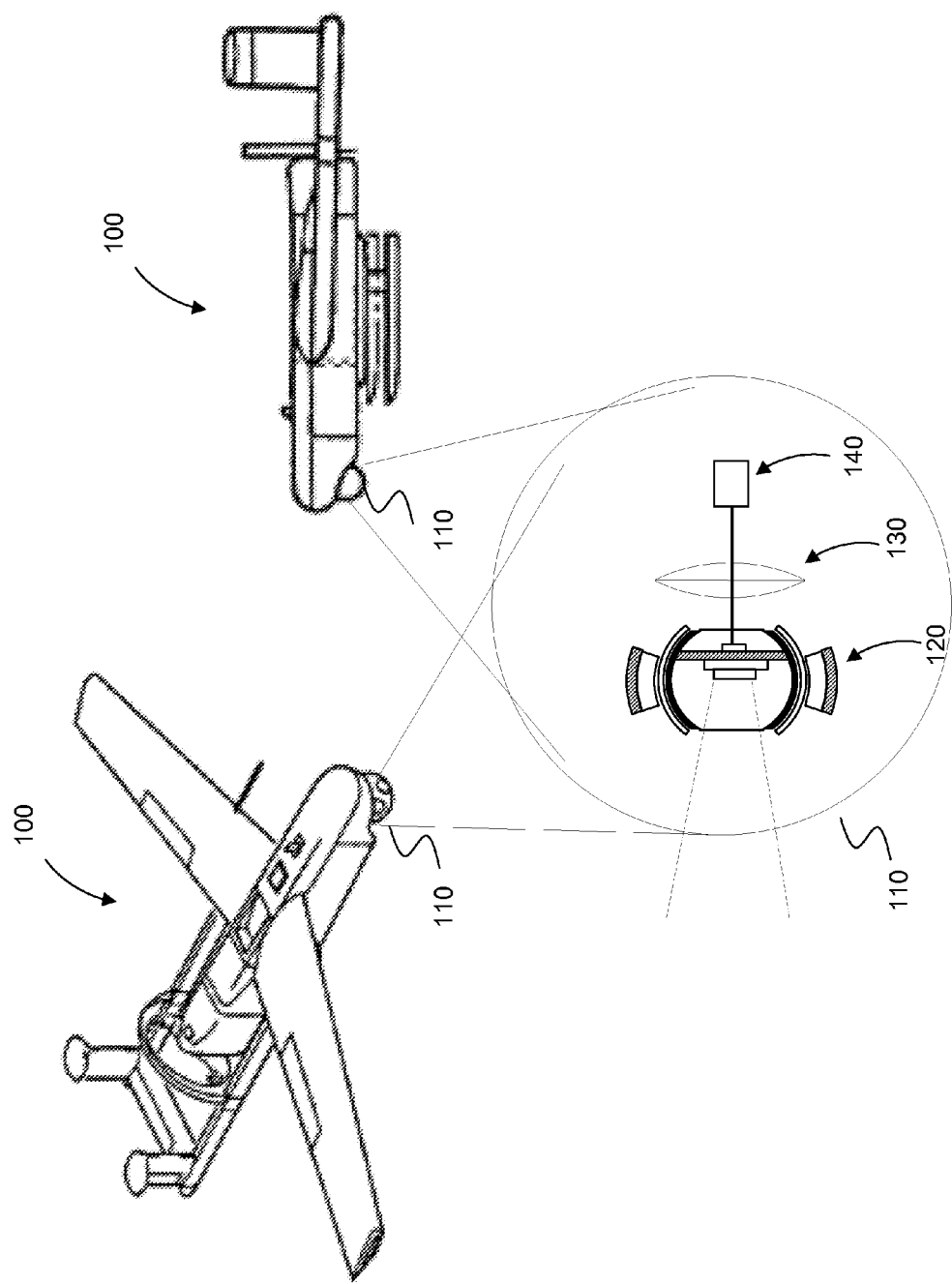
FIG. 1 is a diagram illustrating an Unmanned Aerial Vehicle including one example of a gimbal system consistent with this disclosure.

FIG. 1 is a diagram illustrating both top-down and side perspective views of an Unmanned Aerial Vehicle (UAV) 100 that may implement systems, devices, and methods consistent with this disclosure. FIG. 1 also includes an exploded depiction of a gimbal system 110 consistent with this disclosure, which may be used on a UAV. As previously mentioned, UAVs, such as UAV 100, have become increasingly important in modern military applications. One benefit of UAV's 100 is that they allow for aerial surveillance without a manned aircraft. For aerial surveillance purposes, many UAV's include one or more sensors for the capture of image data or other data. The one or more sensors may also be used for other purposes, such as to enable remote control of a UAV's 100 flight. On-board sensors may capture images and generate data that may be transmitted and processed in real-time to provide video or still images of a UAV 100 environment. It may be advantageous for directional positioning of sensors, such as image sensors, to be automatically or semi-automatically controllable. Also, for on-board sensors (e.g., on-board a UAV 100), it may further be advantageous to stabilize the sensor in a constantly changing environment caused by vehicle motion and environmental effects, e.g., turbulence. For at least these reasons, many UAV 100, along with various other types of surveillance and/or remotely controllable vehicle systems, may employ one or more gimbal systems 110 that carry one or more sensors and provide an ability to automatically or semi-automatically control a directional aiming of the one or more sensors.

Some gimbal systems 110 employ some form of mechanical, electrical, or electro-mechanical mechanism adapted to receive control signals and aim an active portion of a sensor. Some examples of gimbals systems 110 include multiple motors or other actuators with gearing and a connecting structure. Each motor may control an axis of motion of a gimbal assembly 120. One example of a gimbal system 110 consistent with this disclosure is depicted in FIG. 1. The depicted gimbal system 110 is configured to communicate with a gimbal assembly via one or more directional electromagnetic signals as will be discussed in further detail below.

Figure 2A:
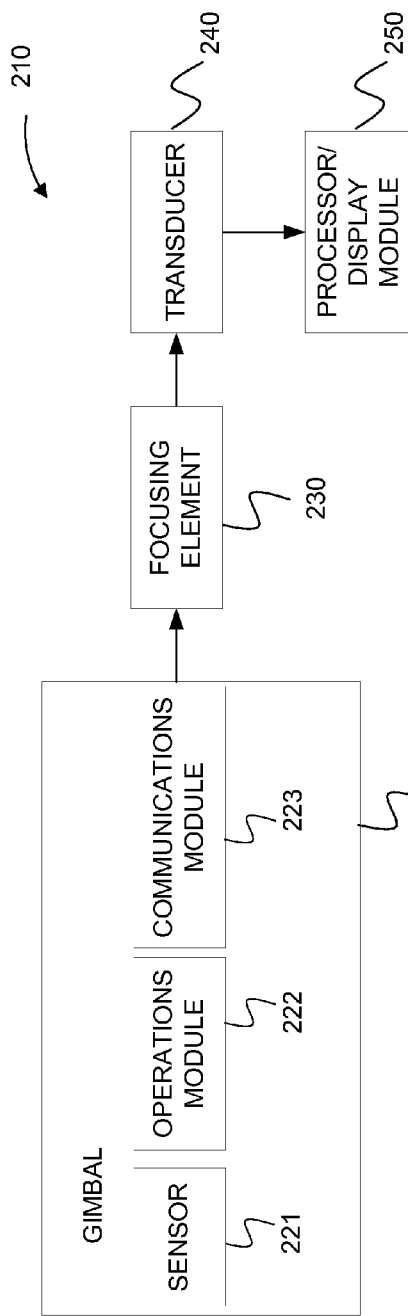
FIG. 2A is a block diagram illustrating one example of a gimbal system consistent with this disclosure.
Figure 2B:
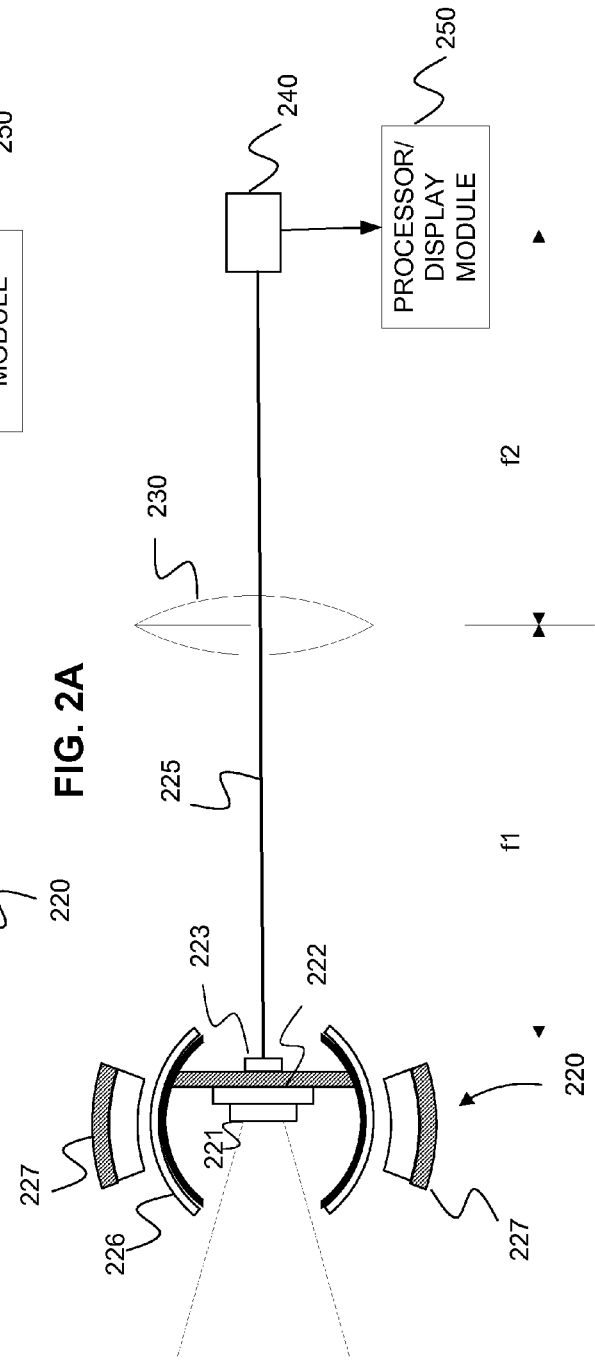
FIG. 2B is a conceptual diagram illustrating one example of a gimbal system consistent with this disclosure.

FIG. 2A is a block diagram illustrating generally a gimbal system 210 consistent with this disclosure, and FIG. 2B is a conceptual diagram illustrating one specific example of a gimbal system 210 consistent with this disclosure. As shown, gimbal system 210 includes gimbal assembly 220. Gimbal assembly 220 includes a spherical or partially spherical housing 226. Housing 226 carries at least one sensor 221. As discussed in further detail below, gimbal assembly 220 may be operative to respond to one or more control signals and correspondingly aim sensor 221 about a range of motion.

Thus, sensor 221 may be automatically or semi-automatically aimed by a user (e.g. a human operator or autonomous collision avoidance system). According to examples where gimbal assembly 220 is carried by an unmanned aircraft, such as UAV 100 of FIG. 1, data captured by sensor 221 may be transmitted from UAV 100 to one or more remote locations (e.g. a military base) where one or more operators may use the image data to control UAV 100.

In one example, gimbal 220 housing 226 may include one or more coils wrapped around an outward facing surface of housing 226. The coils may be vertically or horizontally positioned, or both. Gimbal 220 may also include one or more magnets 227 positioned such that at least a portion of a magnetic field produced by magnets 227 passes through at least a section of the coils.

Magnets 227 may be arranged in a permanent or semi-permanent position, while housing 226 is moveable with respect to magnets 227. Gimbal assembly 220 may be actuated by causing a current to selectively flow through the one or more coils. Current flowing through the one or more coils may interact with a magnetic field of magnets 227, causing movement of housing 226 relative to magnets 227, thus enabling actuation of gimbal assembly 220 to aim sensor 221 about a range of motion.

The above-discussed examples of gimbal assembly 220 are provided merely for purposes of explaining the subject matter of the disclosure described herein. As such, these examples are intended to be non-limiting, and the subject matter described herein is applicable to any gimbal system capable of directionally aiming one or more sensors 221 now known or later developed.

In various examples as discussed above, gimbal assembly 220 is operable to carry and directionally aim one or more sensors 221. The one or more sensors 221 may be any device capable of detecting electromagnetic or thermal energy. For example, the one or more sensors 221 may detect electromagnetic energy in the visible light spectrum, e.g., a camera, photodetector, or other light sensitive sensor. In other examples, sensors 221 may detect infrared, ultra-violet, microwave, X-ray, multispectral, chemical, biological, radiological, nuclear, or any other form of energy. In still another example, sensors 221 may comprise directional temperature sensors that detect thermal energy. Sensors 221 may be capable of detecting the above-described energy in an intermittent fashion (e.g., like a still camera) or in a continuous or semi-continuous fashion (e.g., like a video camera). One of skill in the relevant art will recognize that sensors 221 may be adapted to capture any combination of the above-described forms of energy, in intermittent or continuous fashion, or both.

Gimbal assembly 220 may further carry one or more operations modules 222. Operations module 222 may be a microprocessor, Application Specific Integrated Circuit (ASIC), Field Programmable Gate Array (FPGA), Digital Signal Processor (DSP), or other computational device. Operations module 222 may receive control signals and cause directional aiming of sensor 221. For example, with respect to the example of gimbal assembly 220 depicted in FIG. 2B, operations module 222 may control one or more currents flowing through coils of gimbal assembly 220, and correspondingly cause desired movement of housing 226 relative to magnets 227.

Operations module 222 may process image data captured by sensor 221. For example, operations module 222 may translate, encode, compress, modulate, or otherwise modify image data captured by the one or more sensors 221. Operations module 222 may process image data for transmission from gimbal assembly 220. In some examples, different functions of operations module 222 may be embodied in a single computational device. In other examples, operations module 222 may be embodied in multiple computational devices, for example a first microprocessor that causes directional aiming of sensor 221, and a second microprocessor that processes data captured by sensor 221. Furthermore, operations module 222 may be embodied in separate modules of computational device, e.g., separate circuits of a microprocessor, FPGA or ASIC.

Figure 5:
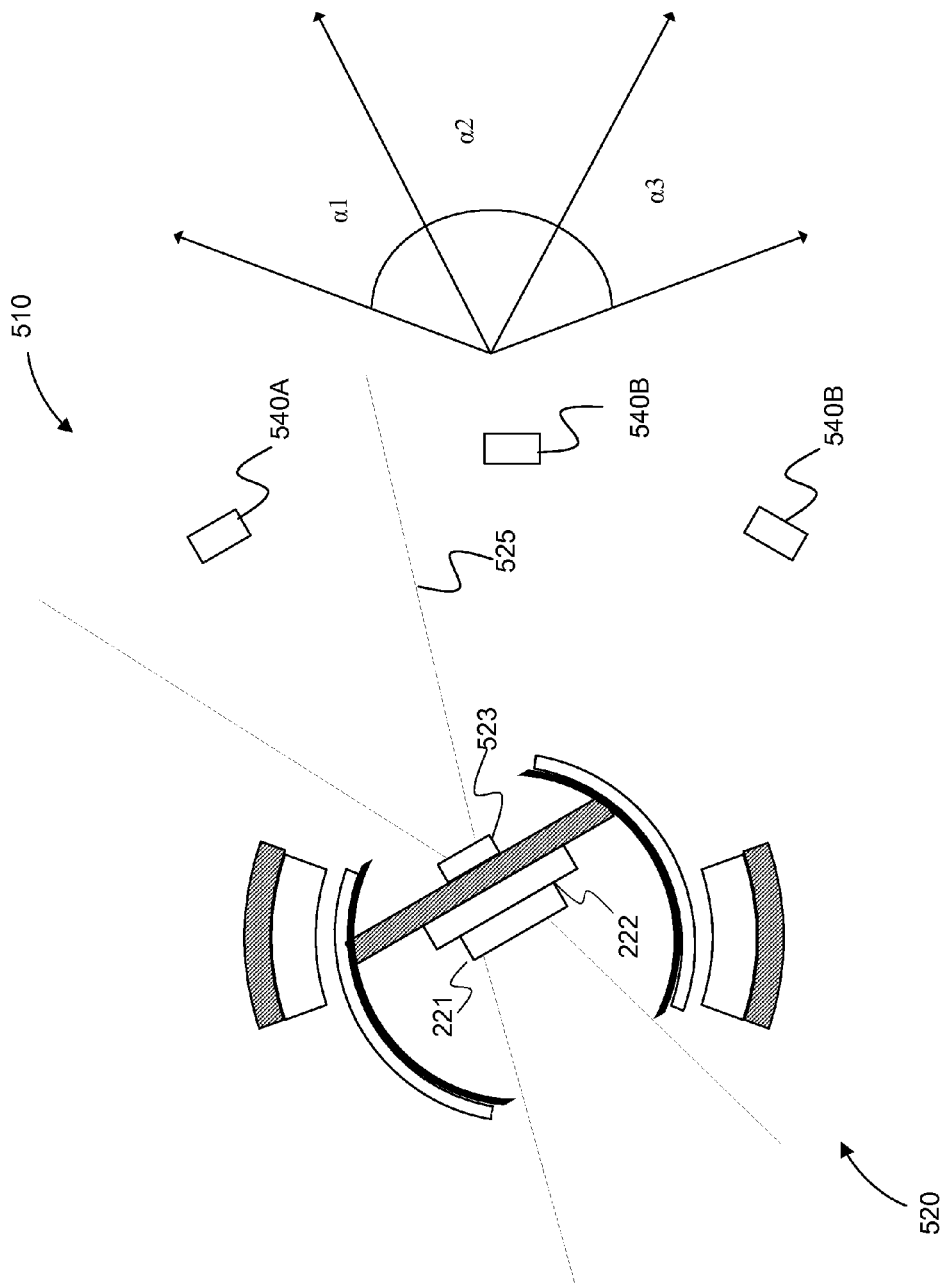
FIG. 5 illustrates an example of a gimbal system that is configured to communicate a broad-beam directional electromagnetic signal consistent with this disclosure.

Gimbal assembly 220 may further include one or more communications modules 223. Communications module 223 may transmit image data captured by sensor 221 from gimbal 220 to one or more transducers or detectors capable of receiving the transmitted image data. Communications module 223 may transmit image data in the form of one or more directional electromagnetic signals 225. In some examples such as depicted in FIG. 2, the one or more directional electromagnetic signals 225 are a narrow-beam electromagnetic signal. In other examples such as depicted in FIG. 5, the one or more directional electromagnetic signals are a broad-beam directional electromagnetic signal. Communications module 223 may transmit one or more directional electromagnetic signals 225 using one or more lasers or Light Emitting Diodes (LEDs). One or more directional electromagnetic signals 225 transmitted by a laser or LED may be of any wavelength of the electromagnetic spectrum, for example visible, infrared, or ultraviolet wavelengths. Moreover, image data transmitted via the one or more directional electromagnetic signals 225 may be transmitted in a digital form, or in analog form. In addition, communications module 223 may transmit one or more directional electromagnetic signals 225 using a plurality of lasers, LEDs, or a combination of lasers and LEDs. Communications module 223 may further transmit directional electromagnetic signals 225 of a plurality of wavelengths, or ranges of wavelengths, of electromagnetic energy.

Communications module 223 may transmit one or more directional electromagnetic signals 225 in a direction different than a direction in which sensor 221 is aimed by gimbal assembly 220. In some examples, as depicted in FIG. 2B, communications module 223 may transmit one or more directional electromagnetic signals 225 in a direction substantially opposite to a direction in which sensor 221 is aimed by gimbal assembly 220.

As also shown in FIGS. 2A-2B, gimbal system 210 may include at least one transducer 240. Transducer 240 may translate one or more directional electromagnetic signals 225 to another form of energy, such as an electrical signal. For example, transducer 240 may comprise a light responsive element that converts a directional electromagnetic signal 225 in the form of optical energy into an electrical signal indicative of data such as image data. Various examples of transducers 240 that convert electromagnetic energy to electrical energy include any combination of: optical detectors (quantum devices in which an individual photon produces a discrete effect), chemical detectors such as photographic plates, photoresistors (also known as Light Dependent Resistors (LDR) which change resistance according to light intensity), photovoltaic cells (also known as solar cells) that produce a voltage and supply an electric current when illuminated, photodiodes, photomultiplier tubes, phototubes, phototransistors, pyroelectric detectors (also known as Golay cells, thermocouples, and thermistors) that respond to a heating effect of incoming radiation, cryogenic detectors, charge coupled devices (CCD), and reverse-biased Light Emitting Diodes (LEDs).

In some examples not depicted, more than one transducer 240 may be employed by gimbal system 210. Multiple transducers 240 may each convert different forms of directional electromagnetic signals 225, or portions of a single directional electromagnetic signal 225. For example, a first transducer 240 may convert a directional electromagnetic signal 225 or portion of a directional electromagnetic signal 225 of a first wavelength, polarity, or other characteristic, while a second transducer 240 may convert a directional electromagnetic signal 225 or portion of a directional electromagnetic signal 225 of a different wavelength, polarity, or other characteristic. Moreover, the one or more transducers 240 may be provided with one or more filters, waveguides, or other electromagnetically operative components to differentiate between directional electromagnetic signals 225 or portions of directional electromagnetic signals 225.

As also shown in FIGS. 2A-2B, transducer 240 may be coupled to one or more processor and/or display modules 250. The one or more processor and/or display modules 250 may receive one or more electrical signals indicative of sensed data and process, display, and/or retransmit the data. For example, where gimbal system 210 is incorporated in a manned aircraft, the one or more processor and/or display modules 250 may process data and provide the data to a user, such as via a display of the manned aircraft. In other examples, processor and/or display modules 250 may communicate data elsewhere for processing and/or display. For example, processor and/or display modules 250 may transmit image data to one or more remote locations, e.g. a military base, aircraft carrier, another aircraft, or the like for processing and/or display. Image data may be transmitted via any communications medium known in the art, including RF communications, cellular network communications, network based communications (e.g. the internet), satellite communications, and the like. Transmitted image data may further be encrypted by various means known in the art to ensure security of transmitted image data.

As also shown in FIGS. 2A-2B, gimbal system 210 may include at least one focusing element 230. While gimbal assembly 220 operates to directionally aim sensor 221 about a range of motion, a transmission direction of the one or more directional electromagnetic signals 225 generated by communications module 223 may correspondingly change. To ensure transmitted data is received by transducer 240, gimbal system 210 may include one or more focusing elements 230 that operate to maintain the one or more directional electromagnetic signals 225 directed upon transducer 240, regardless of a positioning of gimbal assembly 220 about a range of motion of gimbal assembly 220. In various examples, the one or more focusing elements 230 may be a lens, a plurality of lenses arranged along a single path, or a plurality of lenses arranged to direct the one or more directional electromagnetic signals 225 for separate portions of a range of motion of gimbal assembly 220. In one example where communications module 223 transmits a directional electromagnetic signal of wavelengths of the optical spectrum, the one or more focusing elements 230 may be one or more glass, plastic, or similar lenses. In another example where communications module 223 transmits a directional electromagnetic signal of thermal energy, the one or more focusing elements 230 may be one or more quartz lenses. Other types of focusing elements 230 utilized for various types of directional electromagnetic signals are also contemplated. Focusing element 230 may be one or more concave, convex, Fresnel, bioconvex, plano-convex, positive meniscus, negative meniscus, plano-concave, or biconcave lenses, or any combination thereof.

Figure 3:
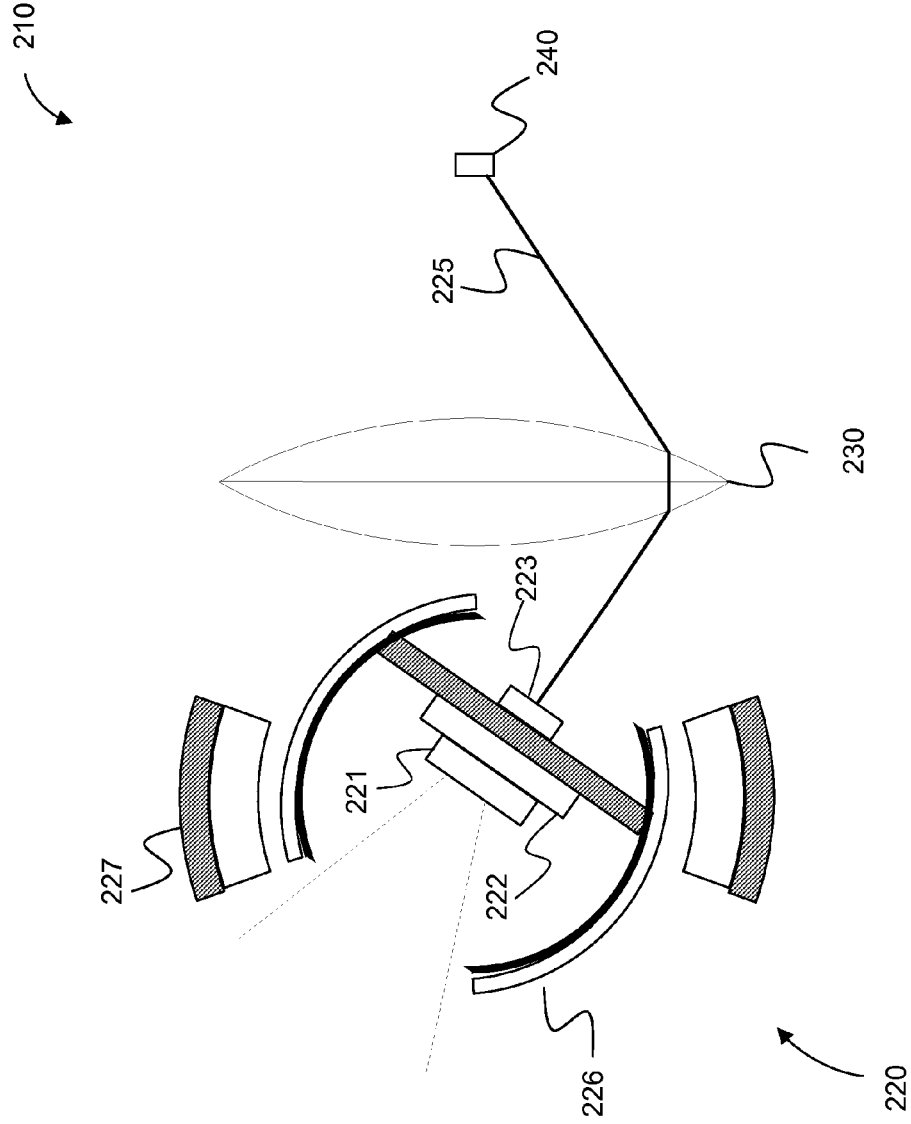
FIG. 3 is a diagram illustrating one example of a gimbal system with a gimbal assembly aiming a sensor consistent with this disclosure.

As illustrated in FIG. 3, the one or more focusing elements 230 may be arranged such that the one or more electromagnetic signals 225 are directed towards transducer 240 for substantially an entire range of motion of gimbal assembly 220. For example, a diameter of focusing element 230 may be selected to be large enough such that, regardless of an operating position of gimbal 220, the one or more directional electromagnetic signals 225 are captured by at least a portion of focusing element 230 and in turn the one or more directional electromagnetic signals 225 are directed to transducer 240. In the example illustration of FIG. 3, gimbal assembly 220 is aiming sensor 221 at an upmost position with respect to the range of motion of gimbal assembly 220, while communication module 223 transmits one or more directional electromagnetic signals 225 in a direction substantially opposed to a direction in which of sensor 221 is aimed. Focusing element 230 is configured such that, in this position, one or more directional electromagnetic signals 225 transmitted by communications module 223 are captured by a bottom portion of focusing element 230 and are directed to transducer 240. For purposes of simplicity, the examples of gimbal system 210 provided in FIG. 2B and FIG. 3 depict gimbal assembly 220 movement in an up/down direction with respect to the page of FIG. 2B and FIG. 3, however one of skill will recognize that the arrangement of gimbal assembly 220, focusing element 230, and transducer 240 may be operable to transmit one or more directional electromagnetic signals 225 about a range of motion of gimbal assembly 220 in side to side or front and back directions with respect to the page of FIG. 2B and FIG. 3 as well.

As illustrated in FIG. 2B, in addition to selection of a diameter of focusing element 230, various other aspects of gimbal system 210 may be selectable based on various characteristics. For example, gimbal assembly 220, focusing element 230, and transducer 240 may be spaced apart by focal lengths f1 and f2. Focal lengths f1 and f2 may be selectable based on an intensity of directional electromagnetic signals 225 transmitted by communications module 223, a type of directional electromagnetic signal 225 (e.g. a wavelength), a quality and/or type (concave, convex, Fresnel . . . etc.) of focusing element 230, a desired bandwidth required for data transmission, and/or a sensitivity of transducer 240. Selection of focal lengths f1 and f2 may further depend on a range of motion of gimbal assembly 220, and a diameter of focusing element 230.

Figure 4:
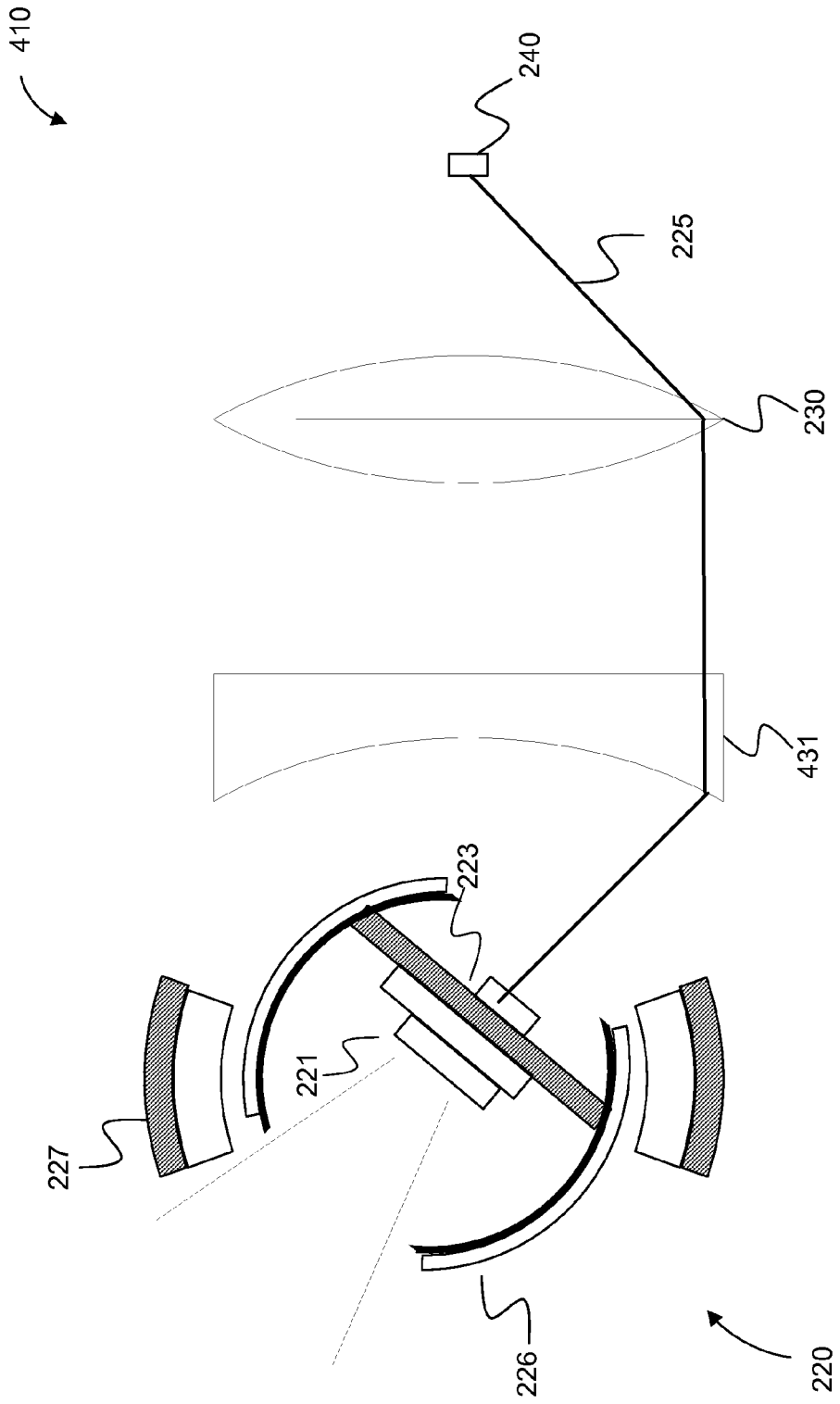
FIG. 4 illustrates an example of a gimbal system that includes multiple focusing elements consistent with this disclosure.

FIG. 4 is a diagram illustrating one example of a gimbal system 410 consistent with this disclosure. Gimbal system 410 is similar to that of system 210 illustrated in FIGS. 1, 2A-2B, and 3, except in addition to focusing element 230, gimbal system 410 includes second focusing element 431. In the embodiment of FIG. 4, second focusing element 431 is positioned between gimbal assembly 220 and first focusing element 230. According to this arrangement, second focusing element 431 may capture at least one directional electromagnetic signal 225, and direct the at least one directional electromagnetic signal towards first focusing element 230. First focusing element 230 may focus the at least one directional electromagnetic signal 225 upon transducer 240 as described above with respect to FIGS. 2A-2B and 3. In one example, first lens 230 is a bioconvex lens, while second lens 431 is a concave or plano-concave lens. In other examples, first lens 230 and second lens 431 may be any combination of concave, convex, Fresnel, bioconvex, plano-convex, positive meniscus, negative meniscus, plano-concave lens, and/or biconcave lenses, or any combination of these lenses. System 410 depicted in FIG. 4 may be advantageous, because the combination of focusing elements 230 and 431 may enable focusing of a directional electromagnetic signal 225 about a range of motion of gimbal assembly 220 using smaller focusing elements (e.g. smaller diameter) than a signal focusing element 230 system as depicted in FIGS. 2A-2B and 3.

FIG. 5 is a diagram illustrating one example of a gimbal system 520 that communicates at least one directional electromagnetic signal that is a broad-beam directional electromagnetic signal 525 consistent with this disclosure. As depicted in FIG. 5, gimbal assembly 520 may include a communications module 523 that transmits a directional electromagnetic signal 525 that is a broad-beam directional electromagnetic signal. Communications module 523 may include one or more LEDs, for example, that transmit the broad-beam directional electromagnetic signal 525. As also depicted in FIG. 5, gimbal system 510 may include one or more transducers 540A-540C. In the example of FIG. 5, three transducers 540A-540C are shown, however a single transducer, two transducers, or more than three transducers are also contemplated.

As also shown in FIG. 5, each of transducers 540A-540C may be arranged to receive broad-beam directional electromagnetic signal 525 for a particular portion of a range of motion of gimbal assembly 520. For example, transducer 540A is arranged to receive broad-beam directional electromagnetic signal 525 for a first range of motional of gimbal assembly 520, transducer 540B is arranged to receive broad-beam directional electromagnetic signal 525 for a second range of motion a2 of gimbal assembly 520, and transducer 540C is arranged to receive broad-beam directional electromagnetic signal 525 for a third range of motion a3 of gimbal assembly 520. In some examples, a number of transducers may be selected such that at least one transducer receives the broad-beam directional electromagnetic signal for substantially the entire range of motion of gimbal assembly 520. In some examples, transducers 540A-540C may be arranged to receive broad-beam directional electromagnetic signal 525 for more than one range of motion of gimbal assembly 520, for example where a broad-beam directional electromagnetic signal 525 overlaps two or more of transducers 540A-540C.

Figure 6:
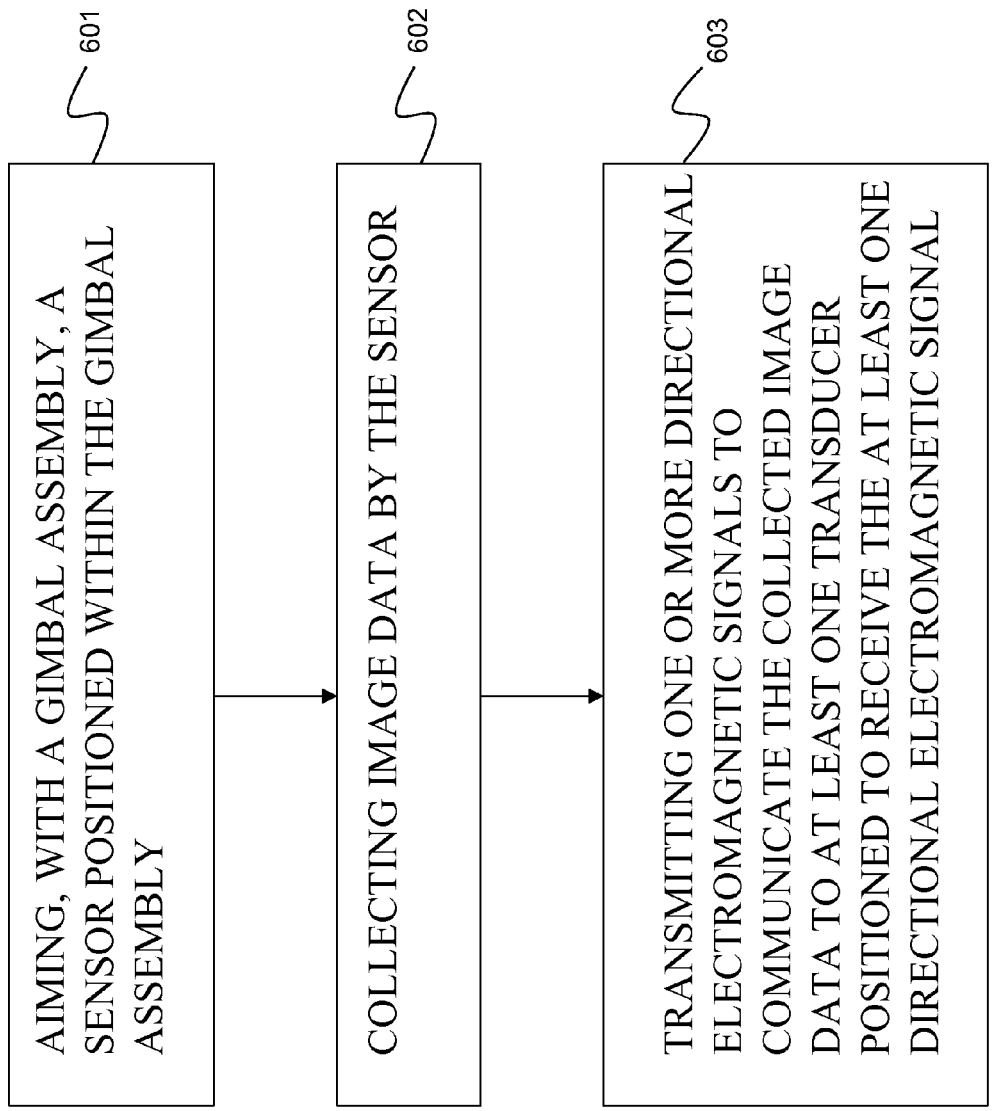
FIG. 6 is a flow chart illustrating one example of a method of operating a gimbal assembly consistent with this disclosure.

FIG. 6 is a flow chart illustrating a method of operating a gimbal system 210 consistent with this disclosure. A sensor 221 positioned within a gimbal assembly 220 is aimed by the gimbal assembly 220 (601). The sensor 221 may be aimed about a range of motion of the gimbal assembly 220. The sensor 221 collects data (602). Collected data may be image data. One or more directional electromagnetic signals 225 to communicate the collected image data are transmitted to at least one transducer 240 positioned to receive the at least one directional electromagnetic signal 225 (603). The at least one directional electromagnetic signal 225 may be a narrow-beam or a broad-beam electromagnetic signal. The at least one directional electromagnetic signal 225 may be focused upon the at least one transducer 240. The at least one directional electromagnetic signal 225 may be focused upon the at least one transducer 240 using at least one focusing element 230. The focusing element 230 may be one or more lenses. The at least one directional electromagnetic signal 225 may be focused about substantially an entire range of motion of the gimbal assembly 220. The at least one directional electromagnetic signal 225 may be transmitted by a laser. The at least one directional electromagnetic 225 signal may be transmitted by a Light Emitting Diode (LED). The sensor 221 may be aimed in a first direction, and the at least one directional electromagnetic signal 225 may be transmitted in a second direction different than the first direction. The second direction may be substantially opposite the first direction.

Figure 7:
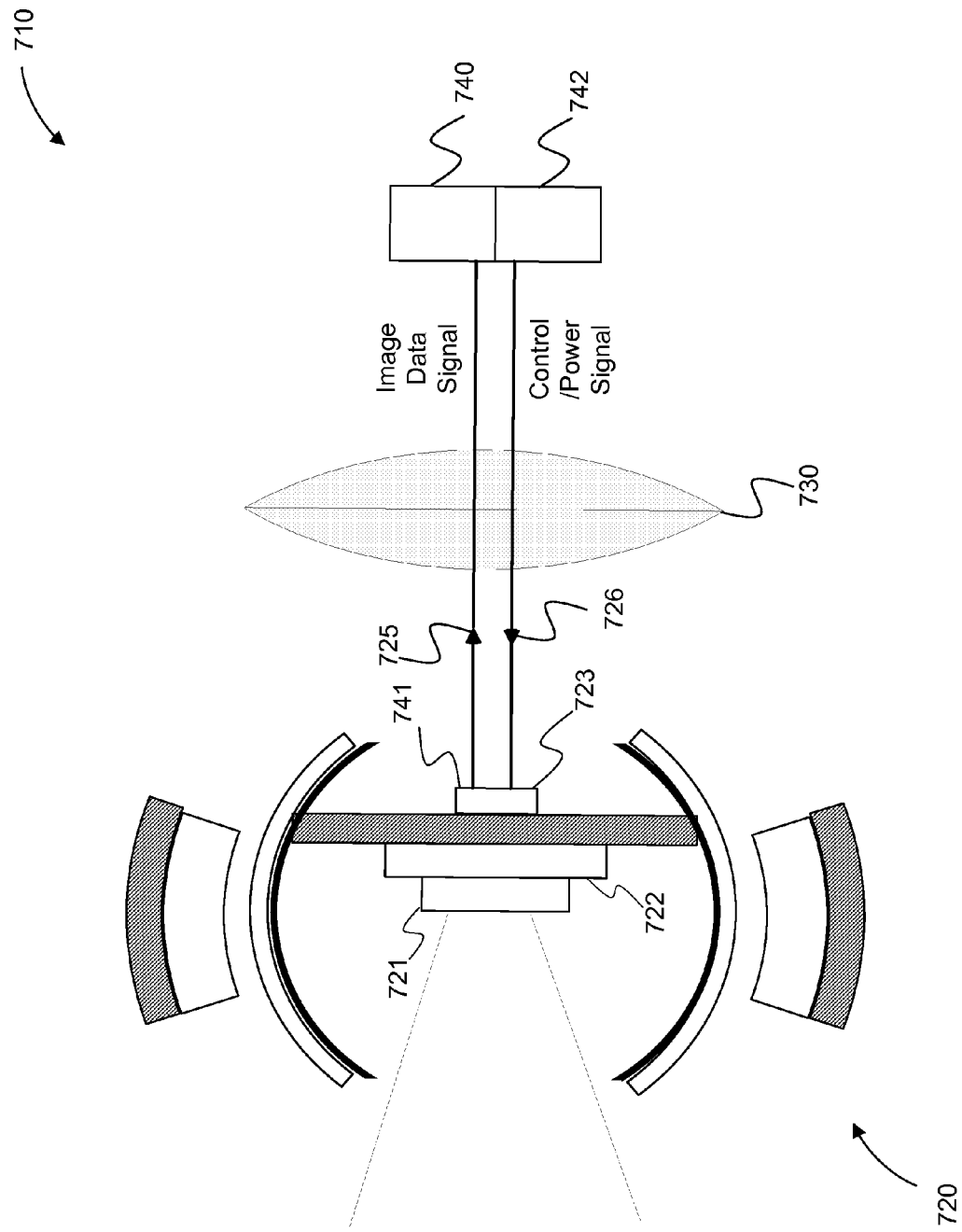
FIG. 7 illustrates one example of a gimbal system configured to communicate information to and from a gimbal assembly consistent with this disclosure.

FIG. 7 is a diagram illustrating a gimbal system 710 that operates to communicate both to and from a gimbal assembly 720 via one or more directional electromagnetic signals consistent with this disclosure. In one example, gimbal system 710 is operable to communicate one or more control signals via one or more directional electromagnetic signals. In another example, gimbal system 710 is operable to communicate power via one or more directional electromagnetic signals.

The example of gimbal system 710 is similar to examples of gimbal systems 210 depicted in FIG. 2B and FIG. 3. However, gimbal system 710 of FIG. 7 further includes to-gimbal communications module 742. To-gimbal communications module 742 may be positioned in proximity to image data transducer 740. To-gimbal communications module 742 may alternatively be positioned distal from transducer 740. In one example, to-gimbal communications module 742 and transducer 740 are formed of the same component (e.g. on a single ASIC, FPGA, DSP, microcontroller . . . etc.). In other examples, to-gimbal communications module 742 and transducer 740 are formed of different components.

In one example, to-gimbal communications module 742 may transmit one or more directional electromagnetic signals 726 to gimbal assembly 720. In one example, the one or more directional electromagnetic signal 726 include at least one indication of control data. In another example, to-gimbal communications module 723 may transmit one or more directional electromagnetic signals 726 that include energy that may be converted into useable power.

Gimbal assembly 720 may include at least one transducer 741. The at least one transducer 741 may function similarly to transducer 240 described above, however in one example transducer 741 may translate at least one directional electromagnetic signals 726 to one or more electrical signals indicative of control data. Operations control module 722 may receive the one or more electrical signals, and correspondingly control directional aiming of gimbal assembly 720.

In another example, transducer may translate at least one directional electromagnetic signal 726 into electrical power. In one example, electrical power extracted from the at least one directional electromagnetic signal 726 may be converted to electrical power that may be used by components of gimbal assembly 720, for example sensor 721, operations control module 722, and/or communications module 723.

Transducer 741 may be arranged proximal to communications module 723. In one example, transducer 741 and communications module 723 are formed of the same component (e.g. on a single ASIC). In other examples, transducer 741 and communications module 723 are formed of different components.

In one example, to-gimbal communications module 742 may directionally aim one or more directional electromagnetic signals 726. To do so, to-gimbal communications module 742 may determine a relative positioning of transducer 741, such that one or more directional electromagnetic signals 726 may be directed upon transducer 741. In one such example, the one or more electromagnetic signals 725 include, in addition to image data, data indicative of gimbal assembly 720 positioning, and to-gimbal communications module 742 may aim directional electromagnetic signal 726 based on the received data indicative of gimbal assembly 720 position. In another example, image data transducer 740 may determine an angle of incidence of one or more directional electromagnetic signals 725 and to-gimbal communications module 742 may aim directional electromagnetic signal 726 based a detected angle of incidence of directional electromagnetic signal 725.

According to both these examples, to-gimbal communications module 723 may determine a relative positioning of transducer 741, and directionally aim one or more directional electromagnetic signals 726 upon control signal transducer 741. To-gimbal communications module 723 may be adapted to directionally aim one or more electromagnetic signals 726 upon transducer 741 via one or more focusing elements 730, similar to the examples described above with respect to image data in FIGS. 2A-2B, and FIGS. 3-5. In some embodiments, a single focusing element or set of focusing elements may focus both of signals 725 and 726. In other embodiments, dedicated focusing elements may be employed for each of respective signals 725 and 726.

In other examples, to-gimbal communications module 742 does not directionally aim electromagnetic signals 726 upon transducer 741. Instead, to-gimbal communications module 742 may transmit one or more directional electromagnetic signals 726 upon transducer 741 only when transducer 741 is in a particular position, e.g. a substantially horizontal position. According to this example, to-gimbal communications module 742 may determine, either based on an angle of incidence of directional electromagnetic signals 725, or based on communicated gimbal assembly 720 position data included in directional electromagnetic signal 725, one or more time periods for communication of control data, and transmit one or more directional electromagnetic signals 726 during those time periods.

In another example not depicted in FIG. 7, to-gimbal communications module 742 transmit a broad-beam directional electromagnetic signal 726, similar to broad-beam directional electromagnetic signal 525 illustrated in FIG. 5. Gimbal assembly 720 may include one or more transducers 741 that receive and/or translate the broad-beam directional electromagnetic signal 726. In one example, both of communications modules 723 and 741 communicate respective broad-beam directional electromagnetic signal 725, 726. In one such example, the communications module 723 may transmit signal 725 in a different wavelength of electromagnetic energy than communications module 741, such that the incoming and outgoing signals 725, 726 are distinguishable. In a related example, each of transducers 740, 741 may be configured to receive a wavelength of respective signals 725, 726.

Various embodiments of the invention have been described. These and other embodiments are within the scope of the following claims.

The invention claimed is:

1. A system, comprising:
    a gimbal assembly;
    a sensor carried by the gimbal assembly, wherein the sensor collects data and wherein the gimbal assembly is controllable to aim the sensor, wherein the gimbal assembly has a range of motion for the sensor to collect the data;
    a communications module carried by the gimbal assembly, wherein the communications module is configured to transmit at least one directional electromagnetic signal that includes the data collected by the sensor;
    at least one transducer positioned to receive the at least one directional electromagnetic signal;
    one or more focusing elements that focus the at least one directional electromagnetic signal upon the at least one transducer about the range of motion of the gimbal assembly for the sensor to collect the data.

2. The system of claim 1, wherein the gimbal assembly is controllable to aim the sensor in a first direction, and wherein the communications module transmits a directional electromagnetic signal in a second direction different than the first direction.

3. The system of claim 2, wherein the second direction is substantially opposed from the first direction.

4. The system of claim 1, wherein the sensor is selected from the group consisting of:
- an image sensor;
- a video sensor;
- a photodetector;
- a thermal sensor;
- a infrared sensor;
- an ultra-violet sensor;
- a microwave sensor;
- an X-ray sensor;
- a multispectral sensor;
- a chemical sensor;
- a biological sensor;
- a radiological sensor; and
- a nuclear sensor.

5. The system of claim 1, wherein the at least one directional electromagnetic signal is an optical signal.

6. The system of claim 1, wherein the at least one directional electromagnetic signal is at least one of a narrow-beam electromagnetic signal or a broad-beam electromagnetic signal.

7. The system of claim 1, further comprising:
an operations module that processes data collected by the sensor and generates at least one signal to be transmitted by the communications module.

8. The system of claim 1, further comprising:
a second communications module positioned external to the gimbal assembly, wherein the second communications module transmits at least one second directional electromagnetic signal to the gimbal assembly.

9. The system of claim 8, wherein the at least one second directional electromagnetic signal includes at least one indication of control information for controlling the gimbal assembly.

10. The system of claim 8, wherein the at least one second electromagnetic signal includes energy, and wherein the gimbal assembly is operative to convert received energy into power.

11. The system of claim 1, wherein a diameter of the one or more focusing elements is large enough such that the at least one directional electromagnetic signal is focused upon the at least one transducer regardless of an operational position of the gimbal assembly about the range of motion of the gimbal assembly.

12. The system of claim 1, wherein the at least one focusing element is sized, shaped, and arranged to focus the at least one directional electromagnetic signal about the range of motion of the gimbal assembly.

13. A method of operating a gimbal, comprising:
aiming, with a gimbal assembly, a sensor positioned within the gimbal assembly about a range of motion of the gimbal assembly;
collecting data by the sensor;
transmitting one or more directional electromagnetic signals that include the data collected by the sensor to one or more transducers positioned to receive the at least one directional electromagnetic signal; and
focusing the at least one directional electromagnetic signal upon the at least one transducer with at least one lens about substantially the entire range of motion of the gimbal.

14. The method of claim 13, wherein aiming the sensor includes aiming in a first direction, and wherein transmitting the at least one directional electromagnetic signal includes transmitting in a second direction substantially opposed to the first direction.

15. The method of claim 13, wherein transmitting the at least one directional electromagnetic signal includes transmitting an optical signal.

16. The method of claim 13, wherein transmitting the at least one directional electromagnetic signal includes transmitting at least one of a narrow-beam signal or a broad-beam signal.

17. The method of claim 13, further comprising:
receiving at least one directional electromagnetic signal; and
converting the at least one directional electromagnetic signal into at least one electrical signal indicative of control information or electrical power.

18. The method of claim 13, wherein the at least one lens is sized, shaped, and arranged to focus the at least one directional electromagnetic signal upon the at least one transducer about the range of motion of the gimbal assembly for the sensor to collect the data.

19. A remotely controlled aircraft, comprising:
an aircraft body;
a gimbal assembly carried by the aircraft body;
a sensor carried by the gimbal assembly wherein the sensor collects image data and the gimbal assembly is controllable to aim the sensor, and wherein the gimbal assembly has a range of motion for the sensor to collect the data;
a communications module within the gimbal assembly wherein the communications module transmits at least one directional electromagnetic signal that includes the image data collected by the sensor;
at least one transducer positioned to receive the at least one directional electromagnetic signal;
one or more focusing elements that focus the at least one directional electromagnetic signal upon the at least one transducer about the range of motion of the gimbal assembly for the sensor to collect the data; and
a display coupled to the at least one transducer that displays the image data.

\* \* \* \* \*